US009247063B2

United States Patent
Pollock et al.

(10) Patent No.: US 9,247,063 B2
(45) Date of Patent: Jan. 26, 2016

(54) METHOD AND SYSTEM FOR PERSONALISING RESPONSES TO CUSTOMER COMMUNICATIONS

(75) Inventors: Steven Samuel Pollock, Los Altos, CA (US); Ashok Mitter Khosla, Palo Alto, CA (US); Abhijit Barde, Sunnyvale, CA (US)

(73) Assignee: West Interactive Corporation II, Omaha, NE (US)

( * ) Notice: Subject to any disclaimer, the term of this patent is extended or adjusted under 35 U.S.C. 154(b) by 1229 days.

(21) Appl. No.: 12/122,404

(22) Filed: May 16, 2008

(65) Prior Publication Data
US 2009/0285384 A1    Nov. 19, 2009

(51) Int. Cl.
H04M 3/00 (2006.01)
H04M 3/523 (2006.01)
H04M 3/436 (2006.01)

(52) U.S. Cl.
CPC ............ *H04M 3/5232* (2013.01); *H04M 3/436* (2013.01); *H04M 2203/408* (2013.01)

(58) Field of Classification Search
CPC ... H04M 3/51; H04M 3/5175; H04M 3/5183; H04M 3/5191; H04M 3/523; H04M 3/5232; H04M 3/5233; H04M 2203/40; H04M 2203/402; H04M 2203/404; H04M 2203/407; H04M 2203/408

USPC ............ 379/265.02, 265.12, 265.05, 265.09, 379/265.1, 265.11, 265.07, 266.07, 266.08, 379/266.1; 709/238

See application file for complete search history.

(56) References Cited

U.S. PATENT DOCUMENTS

| 6,134,530 | A  * | 10/2000 | Bunting et al. ............... 705/7.25 |
| 6,704,410 | B1 * | 3/2004  | McFarlane et al. ....... 379/265.05 |
| 6,832,203 | B1 * | 12/2004 | Villena et al. ................. 705/7.14 |
| 7,068,775 | B1 * | 6/2006  | Lee .......................... 379/265.02 |
| 2003/0005150 | A1 * | 1/2003 | Thompson et al. ........... 709/238 |
| 2005/0177525 | A1 * | 8/2005 | Apple et al. .................. 705/400 |
| 2006/0062376 | A1 * | 3/2006 | Pickford .................. 379/265.12 |
| 2008/0008309 | A1 * | 1/2008 | Dezonno et al. ......... 379/265.02 |
| 2009/0232296 | A1 * | 9/2009 | Jaiswal et al. ........... 379/265.12 |

\* cited by examiner

*Primary Examiner* — Antim Shah (57) ABSTRACT

In one embodiment, the invention provides a method for personalizing a response to an incoming customer communication. The method includes identifying a customer based on an incoming customer communication; selecting a rule applicable to the incoming customer communication, the rule having a destination associated therewith; preparing data to facilitate processing of the incoming customer communication; and routing the call to the destination associated with the selected rule and sending the prepared data to the destination.

20 Claims, 4 Drawing Sheets

METHOD AND SYSTEM FOR PERSONALISING RESPONSES TO CUSTOMER COMMUNICATIONS

FIELD

Embodiments of the present invention relate to personalizing responses to customer communications received electronically.

BACKGROUND

Customer loyalty increases long term profitability. Over time, a company's loyal customers may buy many products. Thus, a customer's overall value increases over time. Consequently, in the realm of customer relationship management, repeat callers, email senders, etc. need to be treated differently from one time interactions.

SUMMARY

In one aspect, the invention provides a method, comprising generating personalization data comprising at least one tag: value pair; associating the personalization data with an incoming customer communication; and selecting a destination for the incoming customer communication based on the personalization data.

In another aspect, the invention provides a method, comprising identifying a customer based on an incoming customer communication; selecting a rule applicable to the incoming customer communication, the rule having a destination associated therewith; preparing data to facilitate processing of the incoming customer communication; and routing the call to the destination associated with the selected rule and sending the prepared data to the destination.

In yet another aspect, the invention provides a method, comprising identifying a customer based on an incoming customer communication; selecting a rule applicable to the incoming customer communication, the rule having a destination associated therewith; preparing data to facilitate processing of the incoming customer communication; and routing the call to the destination associated with the selected rule and sending the prepared data to the destination.

Other aspects of the invention will be apparent from the detailed description below.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention disclose a personalization method and system to selectively process an incoming customer communication based on a differentiation criterion. The incoming customer communication may be any communication that is transmitted over a network. Examples of incoming customer communications include messages (email, instant messages, etc) and telephone calls e.g. a land-based call over the Public-Switched Telephone Network (PSTM) or a mobile telephone call over a Mobile Telephone Network (MTN).

Advantageously, the differentiation criterion may comprise personalized information/data pertaining to a customer from whom the incoming customer communication is received. This allows the personalization system to process the incoming customer communication in a highly personalized manner thereby enhancing customer experience and satisfaction, as will be described.

Figure 1:
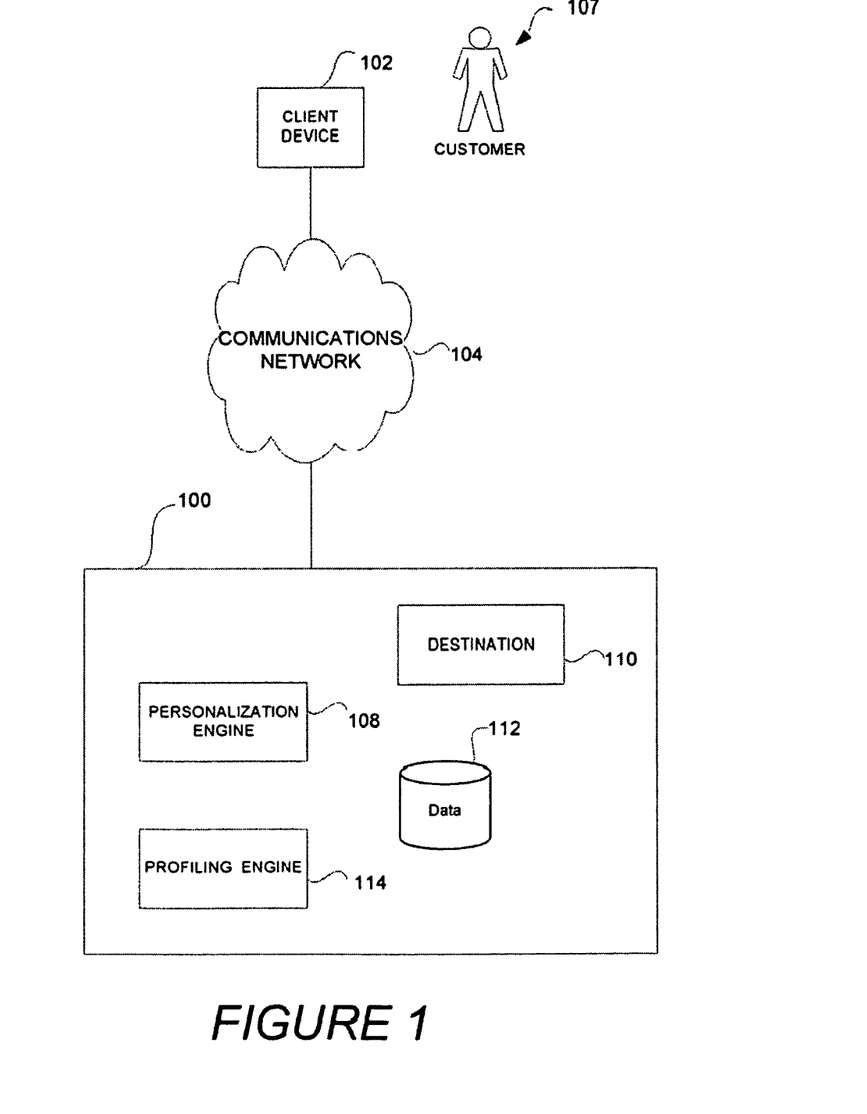
FIG. 1 shows a block diagram of a personalization system in accordance with one embodiment of the invention.

FIG. 1 shows a highly schematic block diagram of a personalization system 100, in accordance with one embodiment. The system 100 includes hardware and software components to enable the system to perform the personalization methods of the present invention, as will be described. The system 100 is configured to receive and process incoming client communications originating from client device 102, and delivered via a communications network 104. The client device 102 may take different forms depending on the nature of the incoming client communication. For example, in one embodiment the client device 102 may be a client computer equipped with an e-mail client. In that case, incoming client communications will be in the form of e-mail messages. In another embodiment, the client device 102 may be a telephone, in which case the incoming client communications will be in the form of telephone calls. The communications network 100 will vary greatly depending on the nature of the client communications. For example in the case of e-mail messages or internet protocol (IP)-based telephone calls, the communications network 104 may include the Internet. In the case of the client communications comprising telephone calls, the communications network 104 may be a public switched telephone network (PSTN), or even a mobile telephone Network (MTN) equipped to transmit telephone messages wirelessly.

For the rest of this description, in order to facilitate a thorough understanding of the various embodiments of the present invention, the incoming client communication will be described as a telephone call. Thus, the client device 102 will comprise a telephone, either land-based, or mobile. The telephone call is initiated by a customer 107 using the client device (telephone) 102. The telephone call is carried by the communications network 104 and terminates at the personalization system 100 for processing therein in accordance with the personalization techniques of the present invention.

Components of the personalization system 100 include a personalization engine 108, a destination 110 to which to hand-off or transfer the call, a database 112, and a profiling engine 114. The destination 110 may be a telephone call of a live agent or that of an automated agent such as a speech application. In some cases the destination 110 may reside outside the system 100. Each of these components may be implemented in hardware or in software. Many components of the system 100, for example, network interfaces etc., have not been shown, so as not to obscure the present invention. However, one of ordinary skill in the art would appreciate that the system 100 necessarily includes these components.

Figure 2:
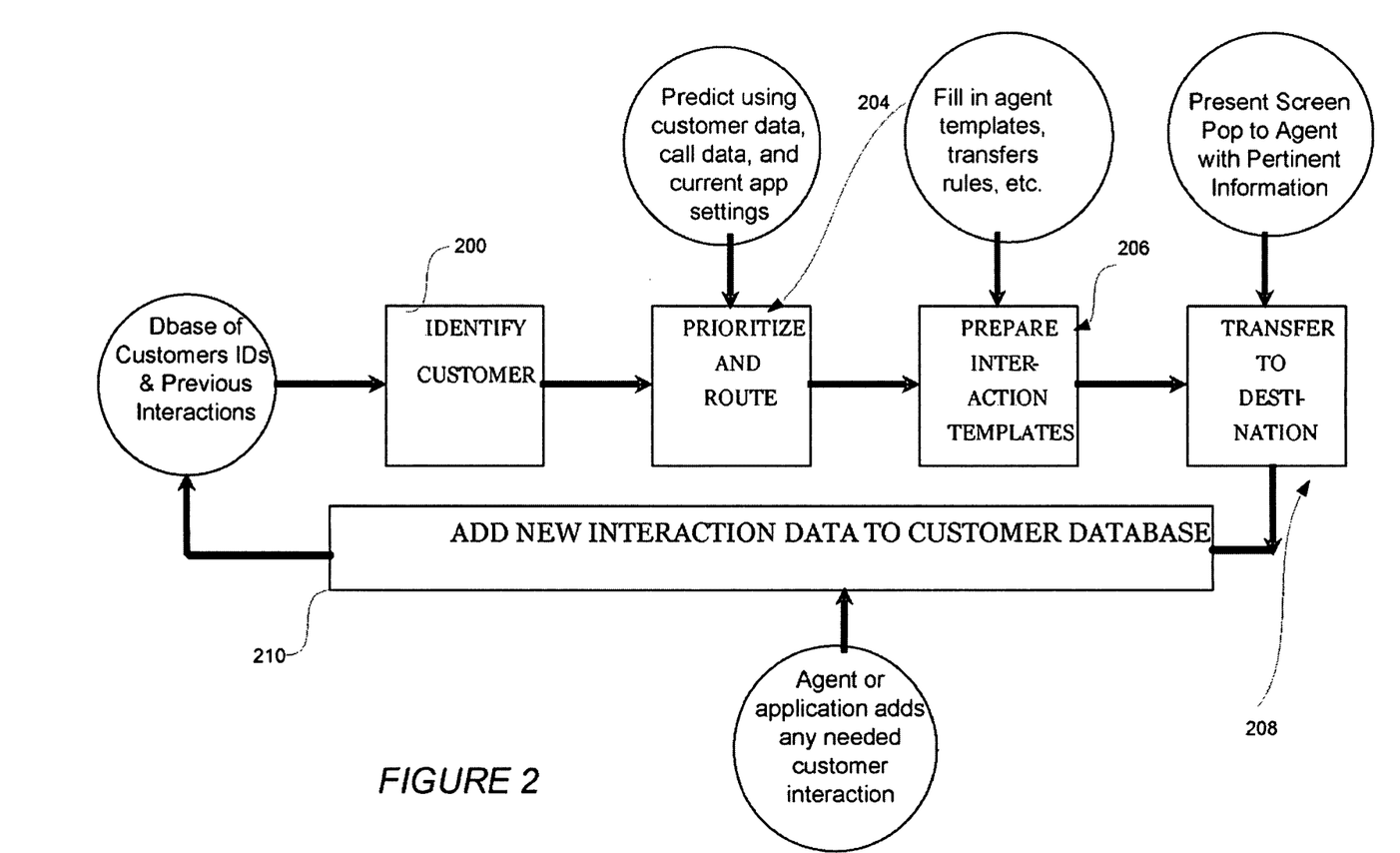
FIG. 2 shows flowchart for a personalization method in accordance with one embodiment of the invention FIG. 3 illustrated a rule selection method, in accordance with one embodiment of the invention.

In one embodiment, the personalization engine 108 includes logic to execute a personalization method illustrated in flowchart form in FIG. 2 of the drawings. Referring to FIG. 2 of the drawings, it will be seen that the personalization method includes the following blocks:

200: Identify

In this block a customer making the call is uniquely identified utilizing a variety of identifiers such Automatic Number Identification (ANI), customer id, email address, IP address, web address uniform resource locator (URL), dialed number identification service (DNIS), form data, interactive voice response (IVR) data, speech recognition data, etc.

202: Prioritize & Route

This block includes logic to decide the customer priority—and to switch the call to the appropriate destination (number, queue, etc.)—based on class of customer, class of problem, etc.

204: Prepare

This block includes logic to do the following: Prepare the customer and the agent. Prepare the customer by giving information like wait time, etc. Auto sell or give other information as needed. Prepare the agent with a screen pop of pertinent information and create an interaction script for a live agent if desired. If transferring to an automated application (i.e. a speech app) provide the application with the data needed to customize its interaction with the customer.

206: Transfer

This block includes logic to :transfer the customer to a destination 110. A destination can be an application, a message, or a telephone number (i.e. an agent). While at that destination, save appropriate data collected from that destination to predict future interactions. This data can be saved to the database 110 at block 208. This creates a feedback loop for learning more about a customer, and for improving customer experience on subsequent visits.

Turning now to FIG. 1 of the drawings, the profiling engine 114 implements several profiling techniques to profile a customer. In one embodiment, the output of the profiling engine 114 is a customer profile which is stored as a database "record" within the database 112. In one embodiment, each customer profile includes a set of fields and values. These fields are referred to as tags. The number of tags is not fixed, and some tags may be missing from a given customer. Each tag has an optional value. As will be described in one embodiment, the personalization engine 108 matches a customer profile to a given action/destination by applying set of rules to the customer profile.

One type of profiling performed by the profiling engine 114, in one embodiment, includes "caller profiling". More information on caller profiling is provided below.

Caller Profiling

For every repeat caller or valued customer, a profile may be created. This profile contains attributes that determine what content to present to which customer under what conditions. The profile can be personalized explicitly by the customer, or implicitly by interaction of the customer with company, or by the company itself. A mix of implicit and explicit personalization techniques may be employed, in one embodiment, to build the customers' trust, thereby encouraging them to divulge other sensitive information.

Explicit Personalization

In one embodiment, the profiling engine 114 performs explicit personalization. Under explicit personalization, the customer voluntarily provides preferences that are used to personalize their interaction. For example, video rental clients can supply their movie genre preferences, such as romance, science fiction, drama, etc. Based on the genre, the agent (a speech application, an automated email response system, or a live agent with a customized customer script) can provide appropriate movie suggestions to the customer. Similarly, based on the customer's sex and age group, wording and tone of the prompts can be customized to appeal and bond with the caller.

Implicit Personalization

In one embodiment, the profiling engine 114 performs implicit personalization. Using implicit personalization, the personalization engine 108 can deduce appropriate actions from externally supplied data, such as a database of previous interactions, external settings such as time of day, weather, etc, or from interaction data provided during the call. For example, in a speech application prompts can be customized based on the caller's past action. If the system finds that the caller called in 5 times in the last month and 4 times out of that the caller called in to check account balance, then next time caller calls in the system should prompt user to find out whether the caller is interested in finding out his/her account balance.

As noted above, the personalization engine 108 includes logic to personalize an interaction with the caller 107. The particular nature of the personalization may vary depending on the nature of the application within which the techniques of the present invention are deployed. However, three use case scenarios are presented below as examples of the types of personalization that may be achieved using the techniques of the present invention.

Credit Card Customer Fraud Check

Step 1: Database: Adding a Tag to an Existing Customer (Performed by the Profiling Engine 114)

As noted above, a customer's profile consists of a number of tags and optional values (i.e. a database record). In one embodiment, each profile is copied for a given call, allowing the profile to be modified during the call.

For example, the tag—"fraudulent use check" may be added to credit card customer John Doe. John gets an automated call from a banking institution e.g. Citibank that says "Warning: We have detected a possible fraudulent transaction with your MasterCard credit. Please call 234-567-8279 as soon as possible to verify current transactions".

Step 2: Identify: Identifying the Customer

John calls the number provided. At the beginning of the call John may provide his credit card number, and phone number (as an id check), and his mother's maiden name. These three pieces of data may be weighted for security. If security passes, John is handed off to a router (see next step). If it fails, a new tag is added to the call's profile (but not to John's database) "fraudulent caller check".

Step 3: Prioritize and Route

If John's is uniquely identified and approved and his fraud check is minor (i.e. <$100) route to an automated application #, If John, is uniquely identified and the fraud check exceeds $100, prioritize based on card type (platinum, gold, silver, etc.), and route to a live agent #, that number/queue being dependent on calculated priority, If John's current call profile has the tag "fraudulent caller check", route him to security.

Step 4: Prepare

If an automated application is to handle the call, then in one embodiment the information is presented to the automated application using e.g. the credit card number as a pointer to customer database, and a pointer to any condition tags created during the call.

If John is a high priority customer (he is), and a live agent is required, then in one embodiment a transcript of previous transactions (for fraud check verification) is prepared, along with a simple question/answer script for the live agent to go through.

If John appears to be fraudulent, present additional information, and use a call script that is more "demanding". Present this as a screen pop to the agent.

Step 5: Transfer

In one embodiment, the personalization engine then transfers the call to either the live agent or the automated application that performs the question/answer script and fills in John's responses. These responses can be added as condition tag/value pairs that can be added to the call, and/or to John's database by the profiling engine 112.

Step 6: Escalation

John becomes angry at the agent e.g. for requiring a fraud check on $50 when his credit card bill is routinely $8000 a month (good customer!). The agent offers to transfer John to their supervisor. The transfer comes to the supervisor through the current PREPARE/TRANSFER mechanism, only in this case, an additional condition tag is added to the call "Supervisor requested". This results in a different template being prepared—one in which all interactions in the present call have been added, along with a different set of questions and answers.

Step 7: Resolution

The supervisor decreases fraud security constraints for John and saves in John's database.

Airline Traveler whose Flight has been Rescheduled

Step 1: Database: Adding a Tag to an Existing Customer (Performed by the Profiling Engine 114)

John's connecting flight Alaska Airlines 357 has been moved due to arctic weather conditions. A tag:value "cancelled flight:#357 pair is added to John's customer profile in the database 116 signifying the canceled flight. John's cell phone has already been registered with Alaska Airlines. Alaska Air leaves him a voicemail, saying that his connecting flight has been delayed. Upon landing on flight Southwest Airlines #456 he will need to connect to a new Alaskan Airlines flight and have his baggage re-routed. He has several choices for his connecting flight.

Step 2: Identify: Identifying the customer

John lands. While the plane is taxiing to the gate, John calls his cellphone and gets the message, presses 8 to reply, Step 3: Prioritize and Route If John is uniquely identified, prioritize based on frequent-flyer miles and first class vs coach, etc.

If John is a VIP customer, transfer him to a phone agent who handles his call over the phone.

If John is an everyday Joe, transfer him to a speech application that does the reroute.

Step 4: Prepare

A list of possible flights out are ordered and prepared as a set of speech prompts (or if a live agent is required, as a screen pop). The speech application or agent will be presented with that data along with a script. Additional information, such as the gate # that John must go to, along with directions to that gate, boarding time, walking time required, etc. are also prepared.

Step 5: Transfer

In this case John is connected to an automated speech application. The speech application asks a few questions to confirm that John is John, and that he was going to fly Alaska Airlines 357, The application apologizes and presents John with alternatives. John selects Alaska Air #007, The application (or agent) then automatically invokes the appropriate reroute for the baggage and notifies the terminal that John will be arriving. and adds a few tags to the call "From flight: Southwest Airlines #457", "Cancelled flight:Alaska Air 357", "Customer ID:John Doe A45678FG". It then presents John with directions to the new gate.

Using the personalized speech application saves John from waiting in line for an agent at the gate. He selects the new connecting flight, the speech app creates the tickets for the new reroute, and automatically reroutes the baggage in the most effective time possible—all before the plane arrives at the gate.

Step 6: Recall

John forgot what gate # he is now going to . . . He calls the Airline Help #. The receiving application realizes that John has yet to check in to his next flight and answers as "hello, I see you need to check in at gate . . . , is that right? The process described above is then repeated.

Repeat Caller (Call Customization)

In frequently used applications, or lengthy calls, callers should be allowed to customize their menu options. One example is a speech application that provides technical support.

In one embodiment, a caller is allowed to bookmark various topics. These topics can then be revisited in a subsequent call. The bookmarks can be created "on-the-fly" while the call is progressing, as is shown in the sample conversation below:

| | |
|---|---|
| System: | It seems that you are having problems with Tony Hawk Pro. |
| System: | Let's get started |
| Caller: | (Barges in) Mark it. |
| System: | OK. If you wish to bookmark this topic, yes or else say continue. |
| Caller: | Yes. (System bookmarks it and continues with normal flow) Caller calls back later on |
| System: | Our system shows that you have bookmarked a few topics. Would you like to hear them? |
| Caller: | Yes. |
| System: | Here are your bookmarks: Bookmark 1: Tony Hawk Pro That's all I have. |

The style of an application designed for repeat users differs sharply from applications built for new users (or infrequent repeat users). Repeat user applications typically have terse, abbreviated prompts often containing domain-specific jargon. Grammars are designed to permit users to speak using the same domain-specific jargon, and built-in help is minimal or absent altogether. All of these attributes are seen as beneficial by users who want to conduct specific business rapidly and efficiently.

Tags

As noted above, in one embodiment the personalization engine 108 makes use of tags to determine outcome based on an incoming set of data. In one embodiment, each piece of data within a customer profile comprises a tag:value pair [the value is optional]. For example the customer identification could be thought of as CustomerName: "John Doe", or it could be thought of as ServiceLevel:"Platinum Club" or it could be thought of as "Unhappy customer", etc. Similarly the conditions could themselves be tags such as "new service delivered" or "credit card fraud check" or "checked status", "checked status", "checked status" (i.e. 3 instances of check status as last three calls). The tag-value pairs may be treated as independant (unordered) or dependant (ordered).

For example an independent tag-value pair set might be
ServiceLevel: Platinum
Customer Name: John Doe
FraudCheckNumTimes: 3
LastFraudCheck: Dec. 10, 2006

In the independent case, the tag-values are independent of each other. Alternatively, the tag-value pairs may be dependant (ordered) for example: Has trouble installing: Repeat call: yes—Has trouble running: Repeat call yes: . . . In this case the fact that the caller is performing a sequence of actions is what is important. The personalization engine 108 will route the call based on a matching of a sequence of actions, not for closest match, as will be described.

As noted above, in one embodiment the personalization 108 engine maps a set of incoming data (customer profile) to a rule. Viewed differently, the personalization engine 108 selects an applicable rule from a set of rules and then processes the incoming call based on the rule. Processing the incoming call based on the rule may include preparing and transferring the call as described above in accordance with the selected rule.

Deterministic finite-state (i.e. as rules-based approaches) or statistical approaches (i.e. vector dot-product, or Hidden Markov model, etc. may be used to select the rule. Advantageously, embodiments of the invention use a statistical approach as opposed to a rules-based approach to select a rule.

A rules-based approach might state something like this If tag XYZ=A then destination=something . . .

Problems associated with the rules-based approach include:
  Rules may conflict with each other—much testing and debugging is required to identify and resolve conflicts
  Rules require an ordering and prioritization. This is related to the above problem
  Rules may rely on data which is incomplete. Imagine for example a rule that depends on three pieces of data where one piece is missing.
  Rule maintenance is highly prone to error. Adding a rule may cause unforeseen consequences with existing rules.

Advantageously, with the statistical approach, allows rule selection in the case of missing/incomplete data, and substantially reduces rule interaction problems. In the real world, it is likely that not all the needed tags may be obtained during a call. Consequently, embodiments of the present invention are able to route a call based on a rule even in the case of absent data.

To illustrate the statistical approach to rule selection in accordance with embodiments of the present invention consider the following illustration:

Imagine data with the following tags, rules and destinations:

| Tag Rule - Fraudulent Credit Card Check | Tag | Match Rule |
|---|---|---|
| | "fraudulent credit card check" | Exist (i.e. A checkbox) |
| | "Customer ID | Don't care |
| | Call Date | 3 days ago to today (i.e. a Date range) |
| | Card Type: Platinum | Exist (i.e. A checkbox) |
| | Average monthly spend | $XXX to $YYY (i.e. a numeric range) |
| | VendorCheck | /[0-3]+ABC/ (i.e. a regular expression match) |

Such a matching rule would generate a 0 or 1 depending on the match of each tag. Applying the entire set of rules for the given data would result in one rule having the closest match to the overall data. That rule's destination would then be selected.

Figure 3:
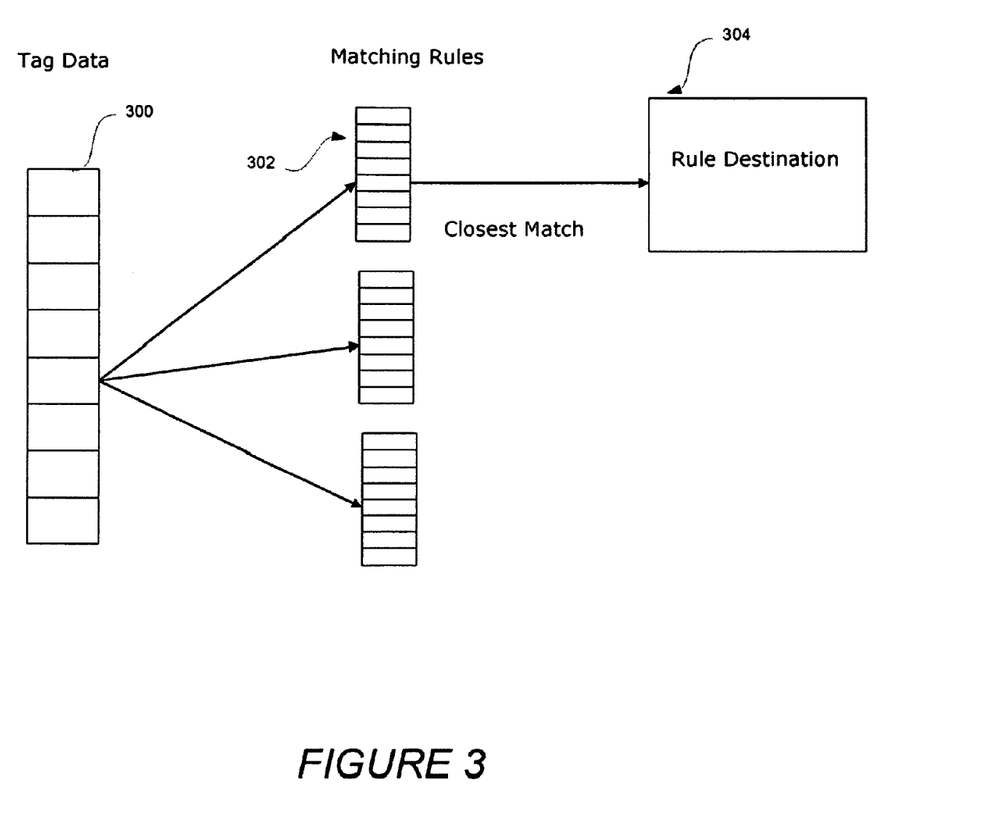

FIG. 3 of the drawings graphically illustrates the rule selection operation performed by the personalization engine 108, in accordance with one embodiment. Referring to FIG. 3, a customer profile comprising tag:value pairs (tag data 300) is matched against a plurality of matching rules in a rules database. As noted above this can be done statistically—as an example, by calculated the vector dot product between the tag data 300 and each of the rules in the rule database. Of the matching rules, the rule that is the closest to the tag data 300 (rule 302 in FIG. 3) is selected. The call is then routed to rule destination 304 which is the rule destination associated with the rule 302.

In one embodiment, a web-based or other computer interface is provided to design rules for the rules database. The interface may allow for the manual creation of rules, or may automatically generate them from sample data. In one embodiment, the interface requires the following for each rule:
  A destination (phone number, prompt, speech application, or another tag-rule set etc.)
  A list of matches—where a match is defined as some sort of matching rule such as string match, date range match, set match, regular-expression match, etc In one embodiment, tags, rules, and destinations may be chained together, to create a more complex routing system.

Figure 4:
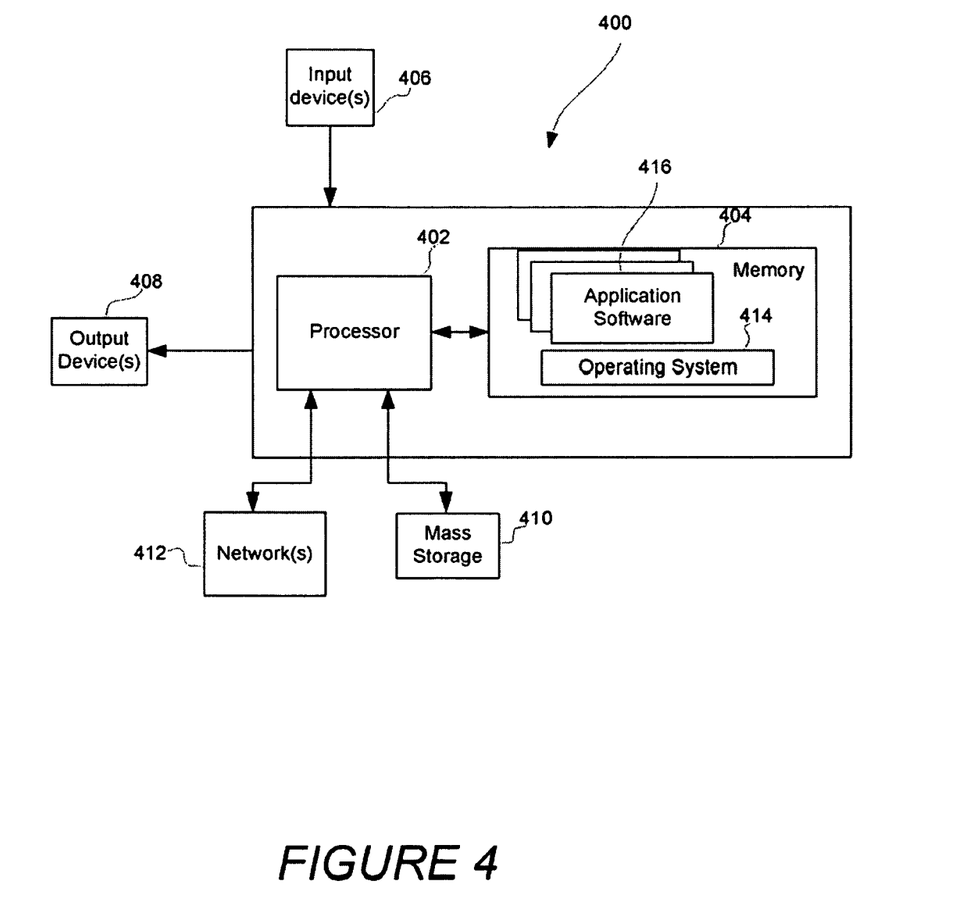
FIG. 4 shows a block diagram of hardware that may be used to implement the personalization system of FIG. 1, in accordance with one embodiment of the invention.

FIG. 4 of the drawings shows an example of hardware 400 for that may be used to realize the personalization system, in accordance with one embodiment of the invention. The hardware 400 typically includes at least one processor 402 coupled to a memory 404. The processor 402 may represent one or more processors (e.g., microprocessors), and the memory 404 may represent random access memory (RAM) devices comprising a main storage of the hardware 400, as well as any supplemental levels of memory e.g., cache memories, non-volatile or back-up memories (e.g. programmable or flash memories), read-only memories, etc. In addition, the memory 404 may be considered to include memory storage physically located elsewhere in the hardware 400, e.g. any cache memory in the processor 402, as well as any storage capacity used as a virtual memory, e.g., as stored on a mass storage device 410.

The hardware 400 also typically receives a number of inputs and outputs for communicating information externally. For interface with a user or operator, the hardware 400 may include one or more user input devices 406 (e.g., a keyboard, a mouse, a scanner etc.) and a display 408 (e.g., a Liquid Crystal Display (LCD) panel). For additional storage, the hardware 400 may also include one or more mass storage devices 410, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 400 may include an interface with one or more networks 412 (e.g., a local area network (LAN), a wide area network (WAN), a wireless network, and/or the Internet among others) to permit the communication of information with other computers coupled to the networks. It should be appreciated that the hardware 400 typically includes suitable analog and/or digital interfaces between the processor 402 and each of the components 404, 406, 408 and 412 as is well known in the art.

The hardware 400 operates under the control of an operating system 414, and executes various computer software applications, components, programs, objects, modules, etc. indicated collectively by reference numeral 416 to perform the personalization techniques described above In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A method, comprising:
   generating, by a processor, personalization data comprising at least one tag: value pair;
   associating, by the processor, the personalization data with an incoming customer communication;
   matching, by the processor, the personalization data against a set of rules in a rule database to determine a rule that most closely matches the personalization data; and
   selecting, by the processor, a destination for the incoming customer communication based on the matching of the personalization data, wherein
   the value pair comprises a customer name, a service level of the customer, satisfaction level of the customer, status of service, or a combination thereof, and
   the matching of the personalization data against the set of rules further comprises
      calculating a vector dot product between the value pair and each of the set of rules in the rule database, and
      selecting a rule of from the set of rules closest to the value pair based on the calculated vector dot product.

2. The method of claim 1, wherein the incoming customer communication comprises a telephone call and the personalization data is generated during the telephone call.

3. The method of claim 1, wherein the personalization data is based on explicitly-received information from the customer.

4. The method of claim 1, wherein the personalization data is based on implicitly-collected information.

5. The method of claim 1, wherein the matching comprises applying a statistical matching technique.

6. The method of claim 1, wherein the matching comprises using a statistical approach to determine the most closely matching rule.

7. A system comprising a processor and a memory coupled to the processor, the memory storing instructions that, when executed by the processor, are configured to cause the system to:
   receive an incoming customer communication;
   retrieve a customer profile associated with the incoming customer communication;
   match the customer profile comprising at least one tag against a plurality of rules to select a rule that best fits data in the customer profile; and
   route the call to a destination associated with the selected rule, wherein
   the at least one tag comprises a value pair comprising a customer name, a service level of the customer, satisfaction level of the customer, status of service, or a combination thereof, and
   the customer profile is matched against the plurality of rules further by
      calculating a vector dot product between the at least one tag of the customer profile and each of the plurality of rules in a rule database, and
      selecting a rule of from the set of rules closest to the value pair based on the calculated vector dot product.

8. The system of claim 7, wherein the matching is based on a statistical technique.

9. The system of claim 7, wherein the customer profile comprises tag: value pairs.

10. The system of claim 9, wherein some of the tag: value pairs are missing.

11. A method, comprising:
    identifying, by a processor, a customer based on an incoming customer communication;
    matching, by the processor, at least one tag against a set of rules in a rule database to determine a rule that most closely matches the at least one tag;
    selecting, by the processor, the rule applicable to the incoming customer communication based on the matching, the rule having a destination associated therewith;
    preparing, by the processor, data to facilitate processing of the incoming customer communication; and routing, by the processor, a call to the destination associated with the selected rule and sending the prepared data to the destination, wherein the at least one tag comprises a value pair comprising a customer name, a service level of the customer, satisfaction level of the customer, status of service, or a combination thereof, and the matching of the at least one tag against the set of rules further comprises calculating a vector dot product between the at least one tag and each of the set of rules in the rule database, and selecting a rule of from the set of rules closest to the value pair based on the calculated vector dot product.

12. The method of claim 11, wherein the customer communication comprises a telephone call.

13. The method of claim 11, wherein the selecting of the applicable rule is based on a statistical matching technique.

14. The method of claim 11, wherein the destination comprises a telephone number associated with a live agent.

15. The method of claim 14, wherein the data comprises information to assist the live agent to handle the call.

16. The method of claim 14, wherein the information comprises a script of prompts to be uttered by the live agent to the customer.

17. A non-transitory computer-readable medium having stored thereon a sequence of instructions that, when executed by a processor, are configured to cause the processor to:

identify a customer based on an incoming customer communication;

match at least one tag against a set of rules in a rule database to determine a rule that most closely matches the at least one tag;

select the rule applicable to the incoming customer communication based on the matching, the rule having a destination associated therewith;

prepare data to facilitate processing of the incoming customer communication; and route a call to the destination associated with the selected rule and sending the prepared data to the destination, wherein the at least one tag comprises a value pair comprising a customer name, a service level of the customer, satisfaction level of the customer, status of service, or a combination thereof, and the at least one tag is matched against the set of rules further comprises calculating a vector dot product between the at least one tag and each of the set of rules in the rule database, and selecting a rule of from the set of rules closest to the value pair based on the calculated vector dot product.

18. The non-transitory computer-readable medium of claim 17, wherein the customer communication comprises a telephone call.

19. The non-transitory computer-readable medium of claim 17, wherein selecting the applicable rule is based on a statistical matching technique.

20. The non-transitory computer-readable medium of claim 17, wherein the destination comprises a telephone number associated with a live agent.

* * * * *